US010764294B1

(12) United States Patent
Wasiq et al.

(10) Patent No.: US 10,764,294 B1
(45) Date of Patent: Sep. 1, 2020

(54) DATA EXFILTRATION CONTROL

(71) Applicant: Amazon Technologies, Inc., Seattle, WA (US)

(72) Inventors: Muhammad Wasiq, Vancouver (CA); Nima Sharifi Mehr, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 421 days.

(21) Appl. No.: 15/067,042

(22) Filed: Mar. 10, 2016

(51) Int. Cl.
*H04L 29/06* (2006.01)
*H04L 9/32* (2006.01)

(52) U.S. Cl.
CPC .......... *H04L 63/101* (2013.01); *H04L 9/3247* (2013.01); *H04L 63/08* (2013.01); *H04L 63/10* (2013.01)

(58) Field of Classification Search
None
See application file for complete search history.

(56) References Cited

U.S. PATENT DOCUMENTS

| | | | | |
|---|---|---|---|---|
| 6,892,307 B1* | 5/2005 | Wood | G06F 21/41 | 713/155 |
| 7,716,240 B2* | 5/2010 | Lim | G06F 21/6227 | 707/781 |
| 8,112,485 B1* | 2/2012 | Cooley | G06Q 10/107 | 709/206 |
| 8,793,806 B1* | 7/2014 | Truong | H04L 63/101 | 713/182 |
| 8,826,390 B1* | 9/2014 | Varda | G06F 21/6218 | 726/4 |
| 9,081,978 B1* | 7/2015 | Connolly | G06F 21/62 | |
| 9,264,237 B2* | 2/2016 | Nguyen | H04L 9/0866 | |
| 9,514,324 B1* | 12/2016 | Potlapally | G06F 21/6218 | |
| 2005/0289655 A1* | 12/2005 | Tidwell | G06F 21/6209 | 726/27 |
| 2008/0148351 A1* | 6/2008 | Bhatia | G06F 21/6218 | 726/2 |
| 2010/0064349 A1* | 3/2010 | Randle | H04L 63/08 | 726/4 |
| 2014/0123225 A1* | 5/2014 | Hopen | H04L 12/2856 | 726/3 |
| 2014/0173707 A1* | 6/2014 | Hollander | H04L 63/10 | 726/7 |

(Continued)

FOREIGN PATENT DOCUMENTS

WO    WO 2016028198 A1 *   2/2016   .............. H04W 4/70

*Primary Examiner* — Khalil Naghdali
(74) *Attorney, Agent, or Firm* — Davis Wright Tremaine LLP

(57) ABSTRACT

A service request and a credential are sent from a customer environment to a service provider. The service provider maintains information, such as a credential whitelist, that identifies which credentials may be used with each customer environment. The service provider identifies the particular customer environment from which the service request was submitted using the IP address of the requester (or other environment-identifying information), and retrieves information that restricts the use of the credentials. A request may be approved or rejected based on the presence of the associated credential in a whitelist notwithstanding whether the credential otherwise authorizes the service request. In some examples, the system is used to limit data exfiltration from a customer environment.

20 Claims, 10 Drawing Sheets

(56) References Cited

U.S. PATENT DOCUMENTS

| | | | |
|---|---|---|---|
| 2014/0189845 A1* | 7/2014 | Cai | H04L 63/0245 726/12 |
| 2015/0082407 A1* | 3/2015 | Galpin | H04L 63/10 726/9 |
| 2016/0099963 A1* | 4/2016 | Mahaffey | H04L 63/1433 726/25 |
| 2016/0150004 A1* | 5/2016 | Hentunen | H04L 67/1036 726/23 |
| 2016/0164921 A1* | 6/2016 | Keys | H04L 63/08 726/1 |
| 2017/0223001 A1* | 8/2017 | Haddad | H04L 63/08 726/7 |
| 2017/0223026 A1* | 8/2017 | Amiri | H04L 63/101 726/1 |
| 2017/0223057 A1* | 8/2017 | Amiri | H04L 63/20 726/1 |
| 2017/0237742 A1* | 8/2017 | Salmela | H04L 63/101 |

* cited by examiner

DATA EXFILTRATION CONTROL

BACKGROUND

Many businesses have adopted the use of remote services such as Internet-based backup, storage, and computing services as a way to augment their growing computing needs. As the use of remote and online services has increased, certain security risks have become a growing concern. One problem of particular concern is data exfiltration. Data exfiltration is the unauthorized transfer of data from a computer system, network, or secure domain. Applications running within a business environment sometimes rely on code provided by third parties for at least some of their functionality. Third parties may provide device drivers, libraries, scripts, or middleware that is essential to the operation of business applications. For a variety of reasons, such as non-availability of source code, ensuring that all third party code is entirely benign is difficult, often requiring a large number of resources. If an attacker is able to place malicious third party code into the business environment, the attacker may use the malicious third party code to access remote storage services and exfiltrate data from within the business environment. Such exfiltration may go unnoticed if the remote storage service used by the attacker is also used for legitimate purposes.

BRIEF DESCRIPTION OF THE DRAWINGS

Various techniques will be described with reference to the drawings, in which.

DETAILED DESCRIPTION

Figure 1:
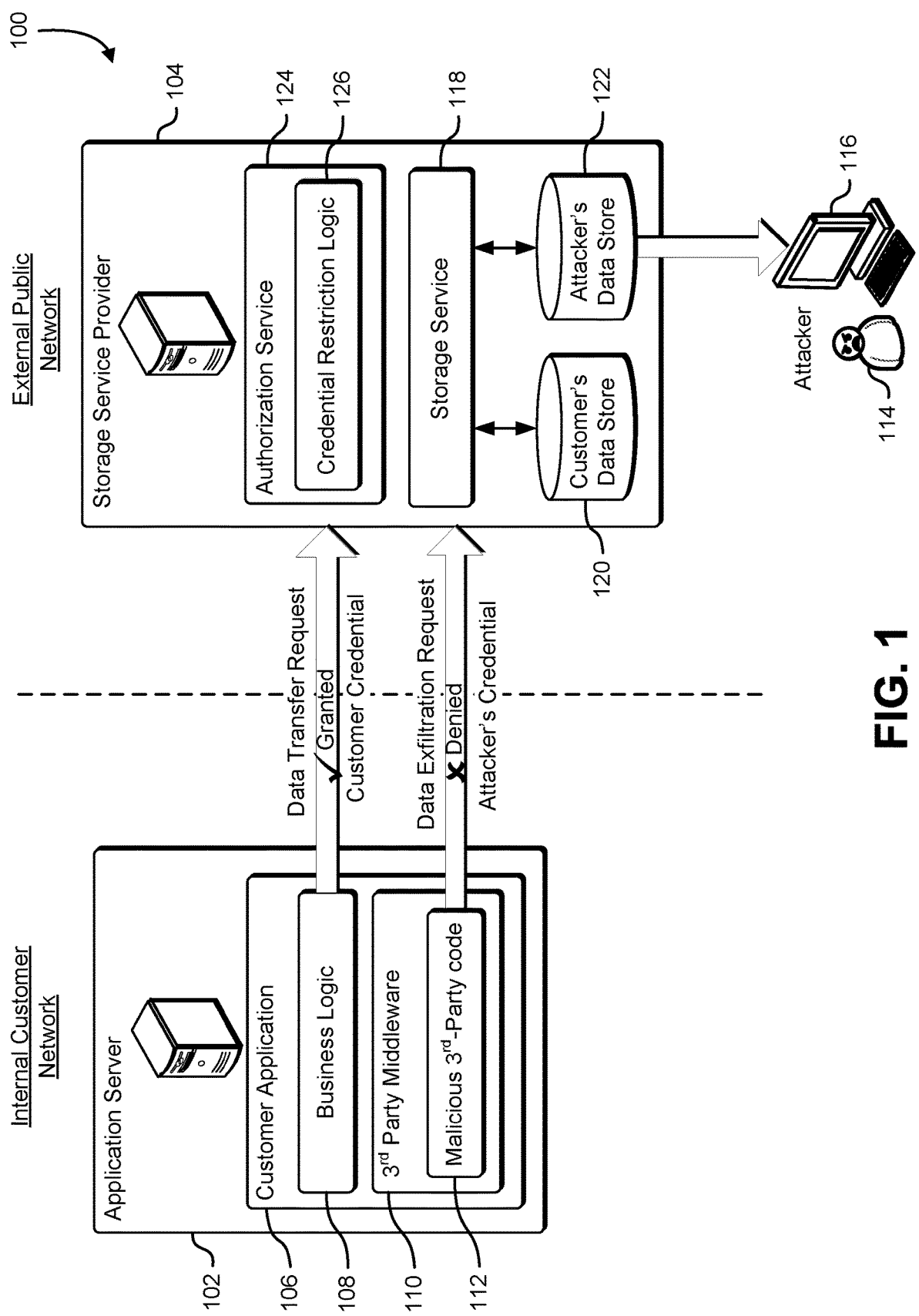
FIG. 1 shows an illustrative example of an environment in which various embodiments may be practiced.

The current document describes systems and methods that limit the ability of an attacker to exfiltrate data from a customer environment. A customer environment may include one or more computing entities, such as servers, virtual machines, containers, computing appliances, or processes. Data exfiltration may be monitored using a network-traffic-monitoring device at the network level, and large transfers of information to an entity outside the customer environment may cause the device to raise an alarm. However, many customers rely on external service providers, such as online data storage services or databases, to provide at least part of their computing infrastructure, and large transfers of information to these external service providers are expected. As a result, if a particular external service provider is used for legitimate business purposes, an attacker may be able to use the particular external service provider to exfiltrate data from the customer environment without raising an alarm. For example, if an attacker is able to deploy and execute malicious code within the customer environment, the attacker can use the malicious code to connect to an external data storage service using the attacker's account on the external data storage service, and then transfer data from within the customer's environment to a data store associated with the attacker's account. Later, the attacker can access the particular data storage service from another location and download the customer's stolen information from the attacker's account. If the external data storage service is also used by the customer for legitimate business purposes, the exfiltration of data by the attacker may go unnoticed.

Such attempts at data exfiltration are mitigated at the external service provider by confirming that the credentials accompanying a service request are in compliance with limitations associated with the customer environment from which the request originates. In some examples, the external service provider maintains a whitelist of allowable credentials for each customer environment. When the external service provider receives a service request from the customer environment, an authorization service associated with the external service provider identifies the particular customer environment from which the request originated. Credentials provided with the request are compared to a whitelist of credentials approved for use with the particular customer environment. If the credentials provided with the request are not in the whitelist, the service request is denied even if the provided credentials would otherwise authorize the request. If the credentials provided with a request are in the whitelist, the request may be authorized provided that the credentials provide sufficient permissions to perform the request.

In another example, the external service provider maintains a set of cryptographic keys that are associated with each customer environment. Credentials provided with service requests are signed with cryptographically verifiable signatures that are able to be verified using the set of cryptographic keys. When the service provider receives a request, the service provider identifies the customer environment from which the request was received, and retrieves the particular set of cryptographic keys associated with the identified customer environment. If the credentials received with the request are not signed with the particular set of cryptographic keys, the credentials received with the request may not be used from the identified customer environment, and the service request is denied. In some implementations, the credentials received with the request may be signed with any key from the particular set of cryptographic keys. In another example, the credentials received with the request must be signed with all keys from the particular set of cryptographic keys.

The credentials used by a particular customer environment may be signed in a number of ways. In some implementations, appropriate cryptographic keys are provided by the service provider to administrators of the customer environment, and the administrators apply signatures to credentials which are approved for use within the customer environment. The service provider records the cryptographic keys in association with information that identifies the customer environment. In another implementation, credentials which are approved for use within the customer environment are submitted to the service provider by an administrator of the customer environment. The service provider generates a new cryptographic key, and retains the new cryptographic key in association with information that identifies the customer environment. The service provider signs the provided credential with the new cryptographic key, and returns the signed credential to the administrator. The administrator distributes the signed credential within the customer environment.

In some embodiments, the service provider maintains profile of allowable permissions for each identified customer environment. Credentials submitted with jobs from particular customer environments are compared against corresponding profiles of allowable permissions. If a particular credential grants permissions outside of the permissions identified by the profile of allowable permissions, a request submitted with a particular credential will be denied. In some implementations, the permissions granted by the particular credential will be limited to the intersection the particular credential and the permissions identified by the profile of allowable permissions. If a particular credential grants permissions equal to, or a subset of those granted by the profile of allowable permissions, the credential may be used with requests from the customer environment.

If a credential whitelist is maintained by the service provider, credentials may be added to the whitelist when the customer environment is created. In some examples, an administrator provides a set of allowable credentials to the service provider as a result of initializing a server, virtual machine, computing appliance, or other computing entity within the customer environment. In another example, the set of allowable credentials is implied as a result of creating a virtual machine, server, computing appliance, or other computing entity. In one implementation, a service provider provides both virtual computing resources and data storage services to customers. If a particular customer requests creation of a virtual machine from the service provider, the credentials used to authorize and create the virtual machine are forwarded to the data storage service and stored in a credential whitelist in association with information that identifies the virtual machine.

The set of credentials that are acceptable from a particular customer environment may be learned as service requests are received and processed by the service provider. In some examples, the service provider generates a whitelist by capturing the credentials used with a threshold number of initial requests from a customer environment to the service provider, and adding the captured credentials to a whitelist in association with information that identifies the customer environment. Once the threshold number of requests has been received, new credentials are not added to the whitelist, and the whitelist is used to identify credentials that are acceptable when submitted with requests from the customer environment. In another example, the service provider generates a whitelist by capturing the credentials used over a threshold amount of time. The distinct captured credentials are added to the whitelist, and the whitelist is used to identify credentials that are acceptable when submitted with requests from a customer environment. In yet another example, the service provider generates a whitelist by capturing the first credential used from a particular customer environment. The first credential is saved in a whitelist in association with information that identifies the particular customer environment. In yet another example, credentials are added to a whitelist as a result of being provided by a trusted source. The trusted source may be identified by a network address of verified domain name. In one implementation, the trusted source issues credentials to a particular customer environment, and adds the issued credentials to a whitelist associated with the particular customer environment at the time the credential is issued. In another implementation, the trusted source provides the credentials to the service provider at the request of the requester, and the service provider adds the credentials to the whitelist based on the identity of the trusted source.

In some situations, a credential that is not in the whitelist may be deemed to be permissible if the rights and permissions granted by the credential are equivalent to or are a subset of the rights and permissions granted by a whitelisted credential. For example, if a service provider receives a service request from a particular customer environment, and the service provider determines that the credentials provided with the service request are not in the whitelist for the particular customer environment, the service provider compares the provided credential to credentials that are in the whitelist for the particular customer environment. If the provided credential allows access to the same or less resources than any single resource in the whitelist, it can be implied that the risk of data exfiltration is low, and the service request may be granted. In another example, the service provider compares the provided credential to credentials that are in the whitelist by comparing the resources accessible with the provided credential to the resources accessible using the union of all the credentials in the whitelist. If the provided credential does not grant access to resources outside the union of all resources granted by all the credentials in the whitelist, it can be implied that the risk of data exfiltration is low and the service request may be granted. In some implementations, when the service provider implies that the risk of data exfiltration is low as described above, the provided credential is added to the whitelist.

In some situations, the service provider may allow data exfiltration on a tentative basis by encrypting data extracted from a customer environment with a cryptographic key controlled by the customer. In one example, a service provider receives a request to transfer data from a customer environment to a storage service. The request includes a credential that is not represented in a whitelist, or otherwise is not approved for use for requests from the customer environment. As a result, the service provider transfers the data from the customer environment, and encrypts the data with a cryptographic key associated with the customer, such as a customer's public cryptographic key. The encrypted data is used to fulfill the request and is transferred to the storage service. If the requester is an attacker, the attacker will be unable to access the encrypted data because the attacker will not have access to a cryptographic key which will decrypt the encrypted data. If the request is authorized by the customer, the customer is able to provide a decryption key to the requester so that the data may be accessed. If the request is not authorized by the customer, the customer does not provide a decryption key, and an attacker will be unable to access the stolen data.

In some implementations, requests may be submitted to a service provider over a communication link that is associated with a session. The session may be used to identify the origin of the requests, and credentials may be stored in association with a session ID.

FIG. 1 shows an illustrative example of an environment in which various embodiments may be practiced. An environment 100 includes an application server 102 and a storage service provider 104 that controls data exfiltration in part by comparing credentials that are provided with a data storage request against a set of approved credentials associated with the customer environment from which the data storage request is presented. The application server 102 may be a computer server, server cluster, computing resource service provider, or virtual machine capable of hosting customer applications. The application server 102 hosts a customer application 106. The customer application 106 includes business logic 108 that implements customer processes and operations. The customer application 106 also includes third-party middleware 110. The third-party middleware 110 is, in general, not written by the customer. As a result, the customer may not have access to the source code associated with the third-party middleware 110, and may rely upon the reputation and diligence of the third-party to ensure the integrity and security of the third-party middleware 110. Nonetheless, it may be possible for the third-party middleware 110 to contain malicious third party code 112. If the malicious third party code 112 is placed within the third-party middleware 110 by an attacker 114, the attacker 114 may be able to use the malicious third party code 112 in an attempt to steal customer data.

Many customer networks include monitoring devices that limit the transfer of customer data from within the internal customer network to an external network. Such monitoring devices may prevent the attacker 114 from transferring customer data directly to an attacker computer system 116. In order to overcome this defense, the attacker 114 may use the storage service provider 104 as an intermediary to exfiltrate data to the attacker computer system 116. The attacker 114 may attempt to use the malicious third party code 112 to transfer customer data to the attacker's data store 122, and then transfer the data from the attacker's data store 122 to the attacker's computer system 116.

The storage service provider 104 includes a storage service 118. The storage service 118 provides data storage services to a variety of clients including the customer application 106 and the attacker computer system 116. The storage service provider 104 allows the customer application 106 to access a customer data store 120, and the storage service provider 104 allows the attacker 114 to access an attacker's data store 122. Access to the various data stores is controlled by an authorization service 124. The authorization service 124 identifies and authenticates the requester, and verifies the credentials provided by the requester with service requests. The authorization service includes credential restriction logic 126. The credential restriction logic 126 identifies the source of a particular service request, and limits the allowable credentials to a particular set of credentials associated with the source of the particular service request. If a service request is received from a particular customer environment, but the credential received with that service request is not associated with a particular customer environment, the service request is denied by the authorization service 124 notwithstanding that the credential may otherwise authorize the operation.

For example, FIG. 1 shows a data transfer request being submitted from the business logic 108. A customer credential is submitted with the data transfer request to the storage service provider 104. The authorization service 124 examines the customer credential and determines that the customer credential authorizes access to the customer's data store 120. The credential restriction logic 126 determines the customer environment from which the data transfer request originated using a network address, a session ID, or computer ID associated with the data transfer request. The credential restriction logic 126 identifies a set of credentials that are allowed to be used from the customer environment. The set of credentials may be identified using a credential whitelist, a digital signature, a relational database, or a credential attribute initialized by an administrator of the customer environment. If the customer credential is present in the set of allowed credentials, the data transfer request is approved and the data is stored in the customer's data store 120.

However, if an attacker uses the malicious third party code 112 in an attempt to transfer information to the attacker's data store 122, the request may be denied even though the attacker's credential may otherwise authorize such a transfer. The malicious third party code 112 sends a data exfiltration request along with the attacker's credential to the storage service provider 104. The authorization service 124 determines that the attacker's credential allows the attacker 114 to write data to the attacker's data store 122. The credential restriction logic 126 identifies the data exfiltration request is coming from the customer environment. Therefore, the data exfiltration request is subjected to a similar limitation as the customers data transfer request. The credential restriction logic 126 retrieves a set of allowable credentials that may be used with requests originating from the customer environment. The attacker's credential is not in the set of allowable credentials, and therefore the credential restriction logic 126 causes the data exfiltration request to be denied.

Credentials may include user IDs, cryptographic keys, digital certificates, passwords, passcodes, or other security identifier used to access the external service provider. Request origins may be specified using a network address, a network address range, an IP address, a block of IP addresses, a virtual machine identifier, an instance ID, a container ID, a hostname, a subnet, a geolocation, or any other property associated with the requester.

Figure 2:
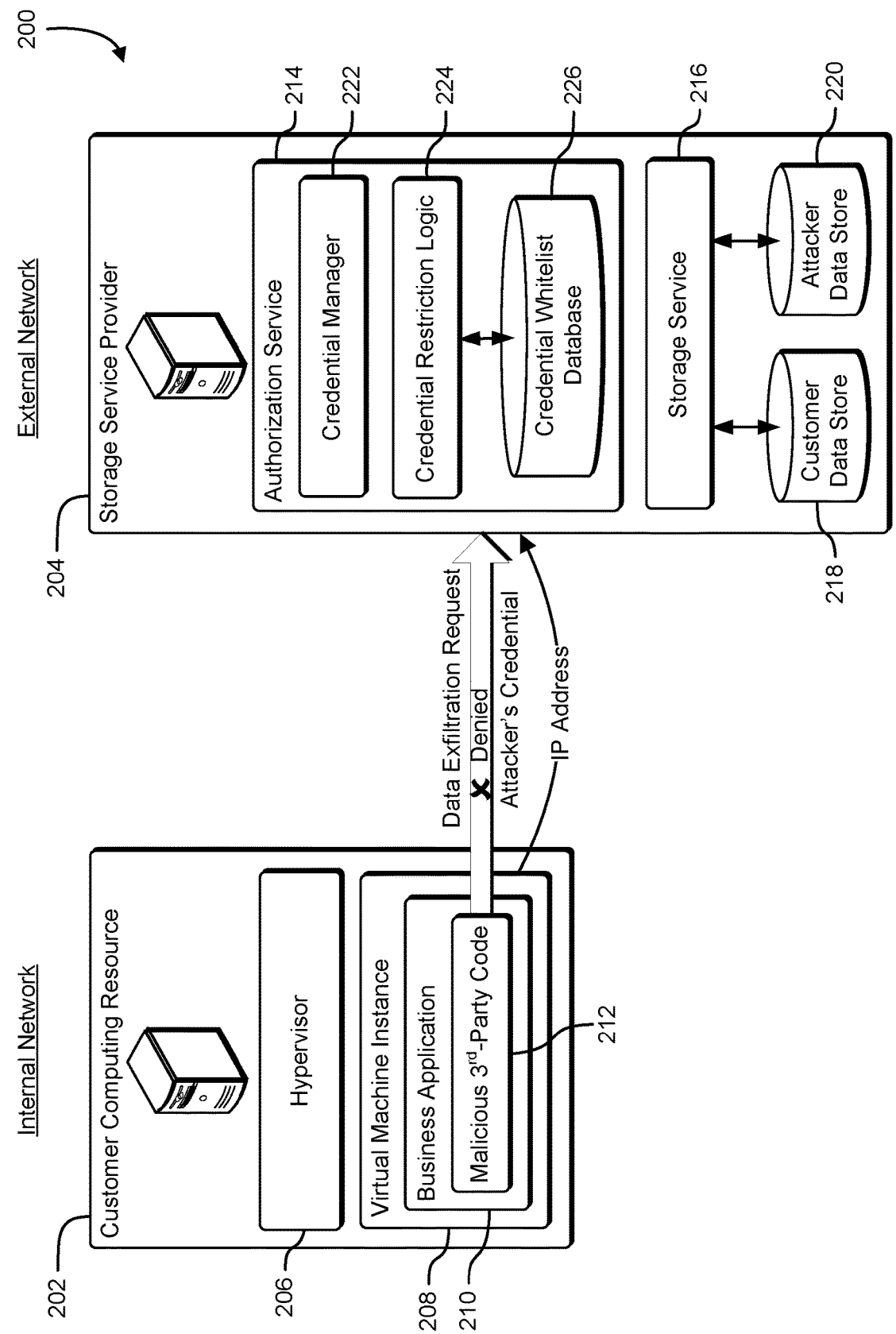
FIG. 2 shows an illustrative example of a storage service provider that controls data exfiltration in part by comparing credentials that are provided with a data storage request against a whitelist of credentials for the entity presenting the data storage request.

FIG. 2 shows an illustrative example of a storage service provider that controls data exfiltration in part by comparing credentials that are provided with a data storage request against a whitelist of credentials for the entity presenting the data storage request. An environment 200 includes a customer computing resource 202 that operates within an internal network belonging to the customer, and a storage service provider 204 that operates on an external network. The customer computing resource can be a server, or server cluster. The customer computing resource includes a hypervisor 206 that provides virtual computing facilities for customer applications. Hypervisor 206 creates and manages a virtual machine instance 208. The virtual machine instance 208 hosts a business application 210 that performs business operations for the customer. In the example shown, the business application 210 includes malicious third party code 212. The malicious third party code 212 may be placed within the business application by an attacker for the purpose of extracting information from a customer environment.

The storage service provider 204 includes an authorization service 214 and a storage service 216. The storage service 216 manages data contained within a customer data store 218 and an attacker data store 220. The customer data store 218 is used by the business application 210 to retain information belonging to the customer. The attacker data store 220 is used by the attacker as an intermediate storage location used in an attempt to facilitate the extraction of customer data from the customer environment without detection. The authorization service 214 includes a credential manager 222, credential restriction logic 224, and a credential whitelist database 226. The credential manager 222 maintains a database of credentials associated with the storage service 216. The credentials define policies, permissions, and rights associated with users, groups, and roles. The credentials are used to determine whether a particular request from a particular requesting entity is allowable. The credential restriction logic 224 uses information maintained in the credential whitelist database 226 to limit the set of credentials which are usable with requests that originate from a particular customer environment. The particular customer environment may be identified by requests originating from a particular IP address, a particular network port, a particular range of IP addresses, a particular subnet, a particular geographical location or region, a particular machine ID, hostname, or collection of computing devices.

In the example shown in FIG. 2, a data exfiltration request is sent from the malicious third party code 212 to the storage service provider 204. The credential restriction logic 224 identifies the source of the data exfiltration request by examining the IP address from which the request was sent, and identifying a particular customer environment. The credential restriction logic 224 queries the credential whitelist database 226 and retrieves a particular credential whitelist associated with a particular customer environment. The particular credential whitelist defines a set of credentials which may be used with requests originating from the particular customer environment. The credential restriction logic 224 determines whether the credential provided with the data exfiltration request is in the set of credentials which may be used with requests originating from the particular customer environment. If the credential is in the set of credentials, the data exfiltration request is approved by the credential restriction logic 224. However in the example shown in FIG. 2, the attacker attempts to write to a data store using a credential owned by the attacker. The attacker's credential is not included in the set of credentials, and the credential restriction logic 224 causes the data exfiltration request to be denied by the authorization service 214.

Figure 3:
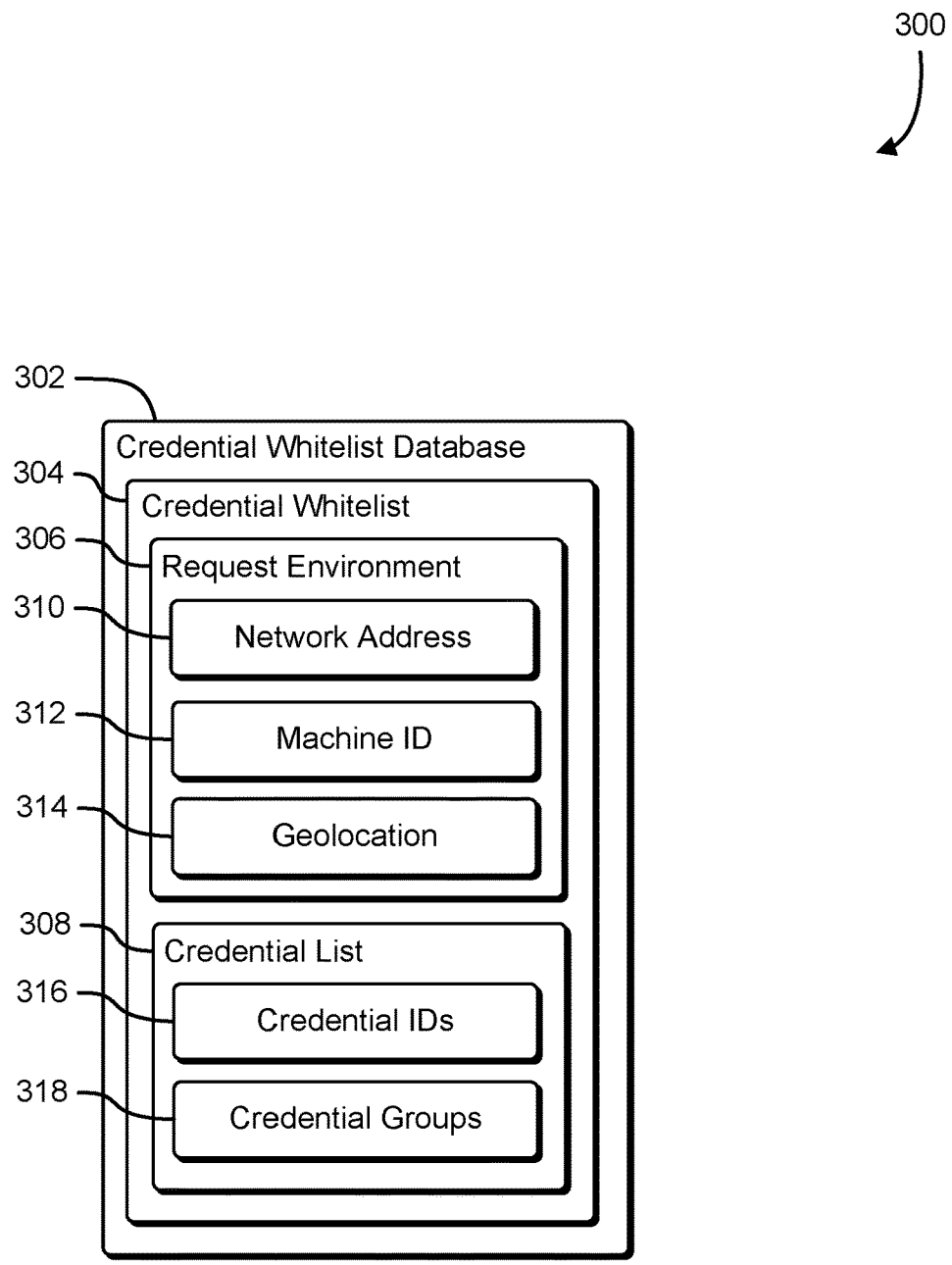
FIG. 3 shows an illustrative example of a credential whitelist that is usable by a service provider to determine whether a service request is authorized.

FIG. 3 shows an illustrative example of a credential whitelist that is usable by a service provider to determine whether a service request is authorized. A data diagram 300 shows a credential whitelist database 302. The credential whitelist database maintains information that defines, for particular customer environments, credentials that may be used with requests that originate from within particular customer environments. A customer environment may be a computer network operated by a particular customer, a computer system, a group of computer systems, a group of computer machines defined by a range of network addresses, a virtual machine, or a particular process or particular application running on a computer system. The credential whitelist database 302 maintains the information as a number of credential whitelists. A particular credential whitelist 304 contains information that identifies a request environment 306 and a credential list 308.

In various examples, the request environment 306 can include one or more of a network address 310, a machine ID 312, and a geolocation 314. The network address 310 can include a plurality of network addresses, or a range of network addresses. The network addresses may take the form of IP addresses, MAC addresses, IPX addresses, or IPv6 addresses. The machine ID 312 may be a machine identifier assigned to a customer computing resource, a processor ID retrieved from a processor unit, or a machine name assigned by an administrator. The geolocation 314 may be represented as an absolute location on the Earth, as a relative location to a location sensor, or as a logical location in a computer network. The request environment 306 may include other information that identifies the source of a service request such as a request-session ID associated with a network connection or a sequence of service requests.

The credential list 308 identifies credentials that are approved for use with service requests from the specified request environment. The credential List 308 includes a set of credential IDs 316, and a set of credential groups 318. The credential IDs 316 identify individual credentials in the credential list. The set of credential groups 318 identifies groups of individual credentials in the credential list. For example, the set of credential groups 318 may include an administrator group. As a result, the credentials of all users that are administrators are added to the whitelist.

Figure 4:
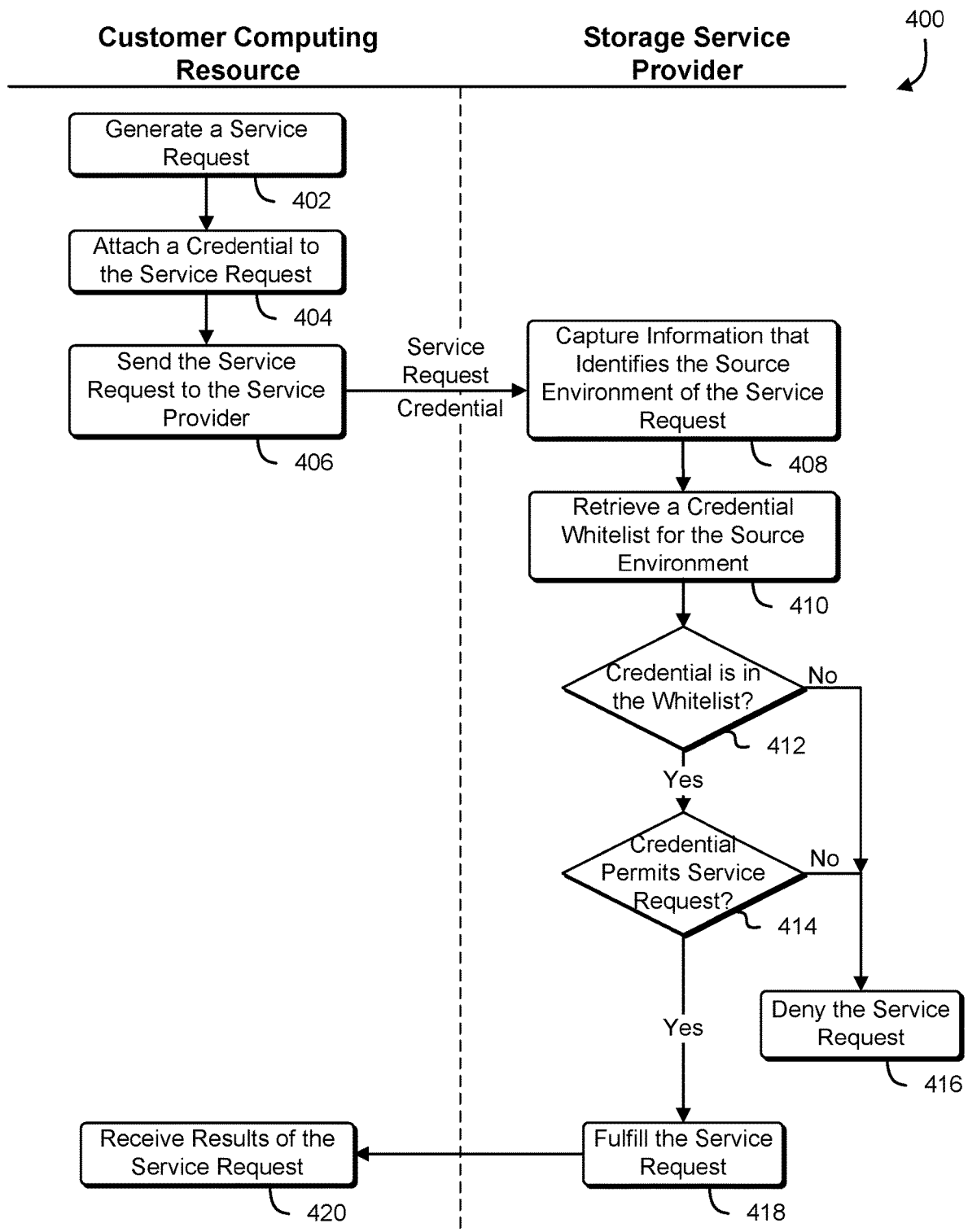
FIG. 4 shows an illustrative example of a process that, when performed by a computing resource provider and a storage service provider, determines whether an service request is authorized based at least in part on a whitelist of credentials maintained by the storage service provider.

FIG. 4 shows an illustrative example of a process that, when performed by a computing resource provider and a storage service provider, determines whether a service request is authorized based at least in part on a whitelist of credentials maintained by the storage service provider. A swim diagram 400 illustrates a process that begins at block 402 with a customer computing resource generating a service request for the storage service provider. The customer computing resource attaches 404 a credential to the generated service request. The credential is selected to have sufficient rights for fulfilling the service request. At block 406, the customer computing resource sends the service request and the credential to the storage service provider.

At block 408, the storage service provider receives the service request and the associated credential from the customer computing resource. The storage service provider captures information that identifies the source of the service request. In some examples, the storage service provider identifies the source of the service request by examining the network address from which the service request was sent. In another example, the storage service provider identifies the source of the service request from a machine ID provided with the service request. At block 410, the storage service provider retrieves a credential whitelist for the identified source environment. The credential whitelist specifies which credentials are accepted for requests that originate from the identified source environment. At decision block 412, the storage service provider determines whether the credential supplied with the service request is in the credential whitelist. The credential is in the whitelist if the whitelist contains information that identifies the credential such as a credential ID or a group that includes the credential. If the credential provided with the service request is in the credential whitelist, execution proceeds to decision block 414, but if the credential provided with the service request is not in the credential whitelist, execution proceeds to block 416 and the service request is denied. At decision block 414, the storage service provider determines whether the credential provided with the service request authorizes the request. The credential authorizes the request when the permissions and policies associated with the credential grant rights are sufficient to fulfill the request. If the credential does not authorize the service request, execution proceeds to block 416 and the service request is denied.

In some implementations, the service request is denied by fulfilling the request, and protecting the results of the request until the request is approved by the customer. In some examples, the results of the request are protected by encrypting the results with a cryptographic key belonging to the customer. The cryptographic key may be a public key of a public-private key pair, or a symmetric key. In another example, the results are retained in protected storage, and secured with credentials that are known only to the customer. When the customer is notified that a requester's request has been denied, the customer may approve or deny the request. If the customer approves of the requester's request, the customer provides the cryptographic key or credential to the requester, allowing the requester to access the results of the request. If the customer does not approve of the requester's request, the customer does not provide the cryptographic key or credential to the requester, and the requester will be unable to access the plaintext of the request results.

If the credential authorizes the service request, execution proceeds to block 418 and the service request is fulfilled by the storage service provider. As a result of fulfilling the storage service request, the storage service provider provides results to the customer computing resource. At block 420, the customer computing resource receives the results from the storage service provider.

Figure 5:
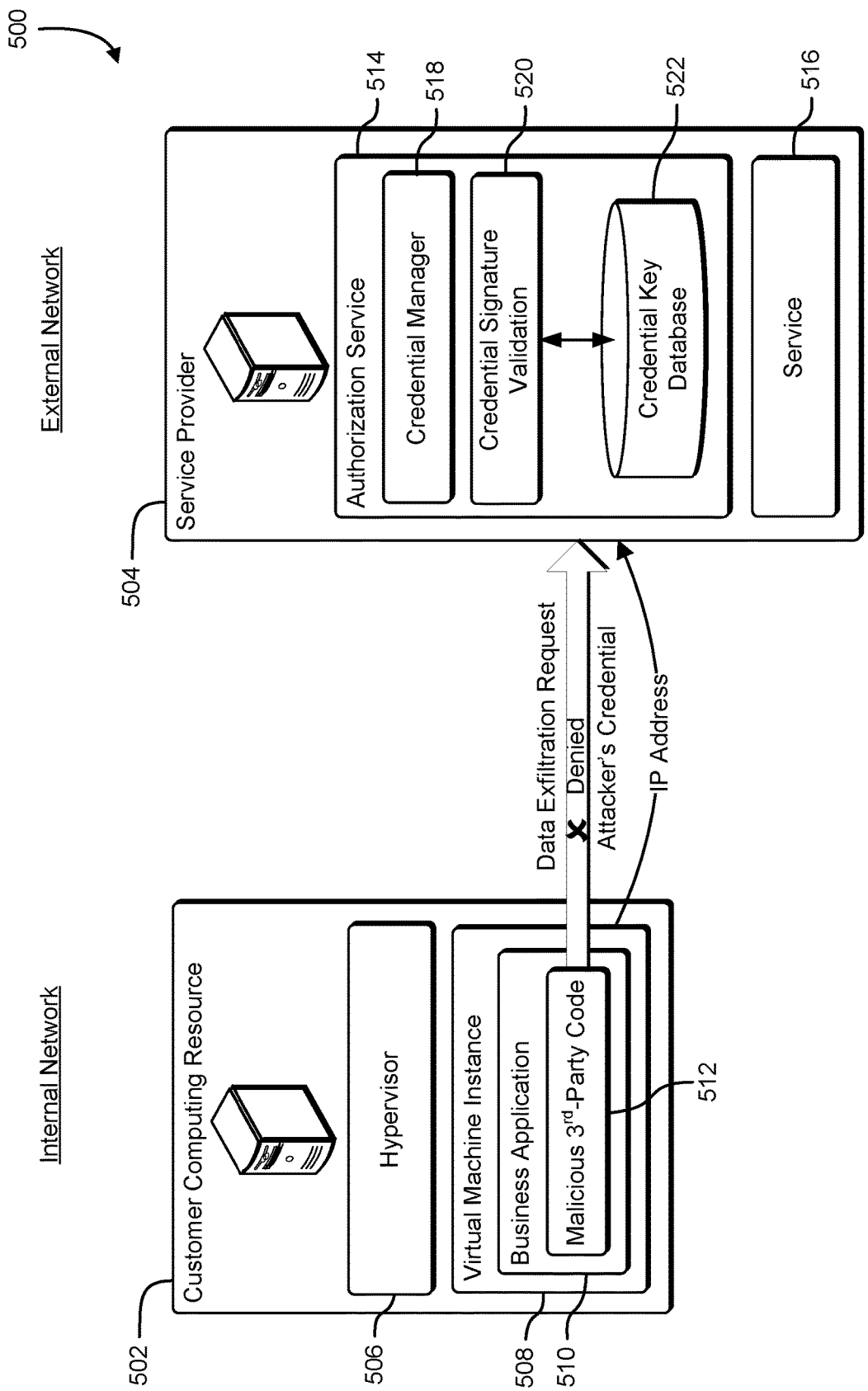
FIG. 5 shows an illustrative example of a service provider that controls data exfiltration in part by validating a digital signature of a credential that is provided with a service request.

FIG. 5 shows an illustrative example of a service provider that controls data exfiltration in part by validating a digital signature of a credential that is provided with a service request. An environment 500 includes a customer computing resource 502 that operates within an internal network belonging to the customer, and a service provider 504 that operates on an external network. The customer computing resource can be a server, or server cluster. The customer computing resource includes a hypervisor 506 that provides virtual computing facilities for customer applications. The hypervisor 506 creates and manages a virtual machine instance 508. The virtual machine instance 508 hosts a business application 510 that performs business operations for the customer. In the example shown, the business application 510 includes malicious third party code 512. The malicious third party code 512 may be placed within the business application by an attacker for the purpose of extracting information from a customer environment.

The service provider 504 includes an authorization service 514 and a service 516. The service 516 may be a storage service, messaging service, or other service that may be used to relay information out of the customer network. The authorization service 514 includes a credential manager 518, credential signature validation logic 520, and a credential key data base 522. The credential manager 518 maintains a database of credentials associated with the service 516. The credentials define policies, permissions, and rights associated with users, groups, and roles. The credentials are used to determine whether a particular request from a particular requesting entity is able to be fulfilled. The credential signature validation logic 520 uses information maintained in the credential key data base 522 to limit the set of credentials that are usable with requests that originate from a particular customer environment. The particular customer environment may be identified by requests originating from a particular IP address, a particular network port, a particular range of IP addresses, a particular subnet, a particular geographical location or region, a particular machine ID, hostname, or collection of computing devices.

In some examples, a data exfiltration request is sent from the malicious third party code 512 to the service provider 504. The credential signature validation logic 520 identifies the source of the data exfiltration request by examining the IP address from which the request was sent, and identifying a particular customer environment. The credential signature validation logic 520 queries the credential key data base 522 and retrieves a credential key list associated with the identified particular customer environment. The credential key list includes a number of cryptographic keys. The cryptographic keys may be used to indicate credentials which may be used with requests originating from the particular customer environment. Administrators of customer environments are provided with associated cryptographic keys which are used to sign credentials that are approved for use with requests that originate from their respective customer environments. When the service provider 504 receives a service request, a credential received with the service request is checked for the presence of the digital signature. If the credential is signed using a cryptographic key from the credential key list of the environment from which the service request was sent, the authorization service 514 may approve the service request. If the credential is not signed, or the credential is signed using a cryptographic key not present in the credential key list, the service request is denied by the authorization service 514.

Figure 6:
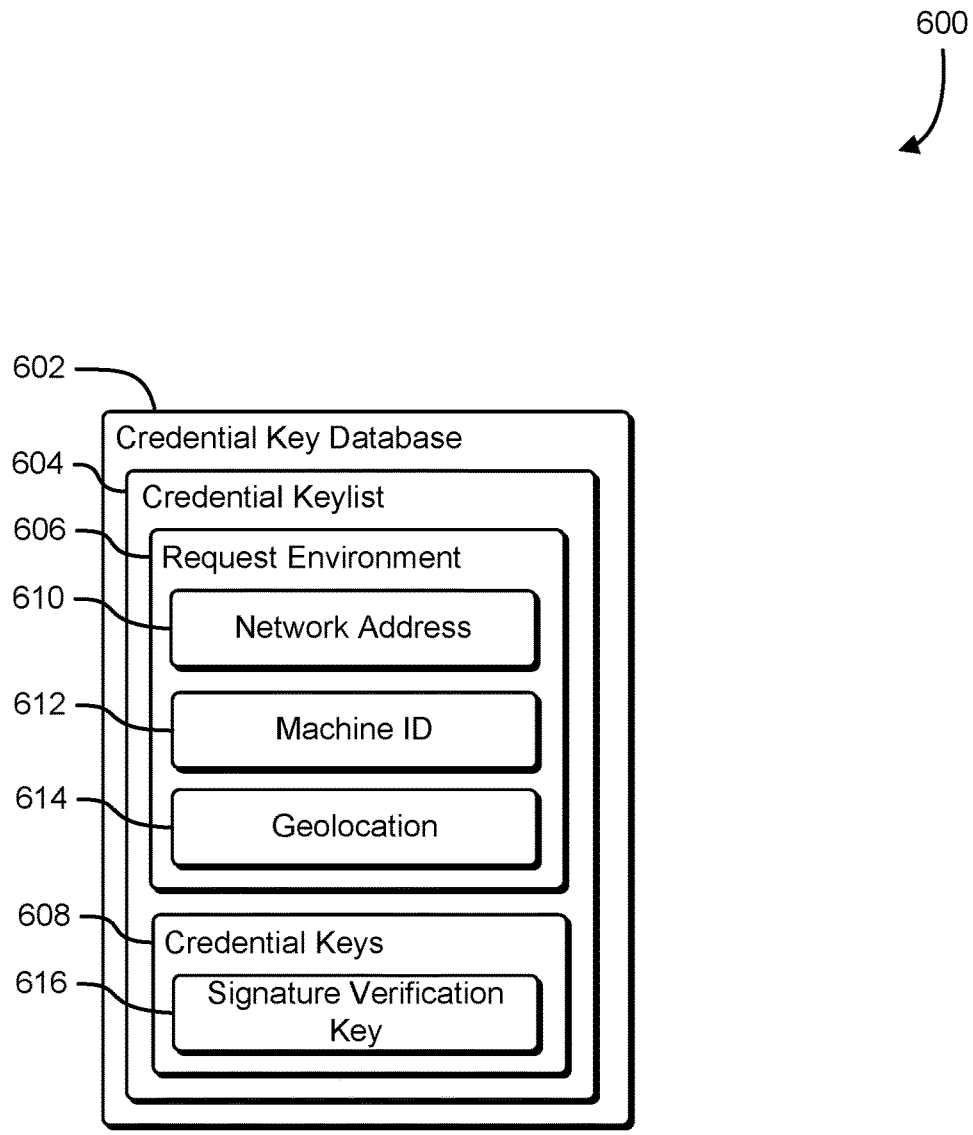
FIG. 6 shows an illustrative example of a credential key data store that can be used by a service provider to validate credentials submitted from an entity that submits a service request.

FIG. 6 shows an illustrative example of a credential key data store that can be used by a service provider to validate credentials submitted from an entity that submits a service request. A data diagram 600 shows a credential key data base 602. The credential key database 602 may be implemented using a database on the service provider or on a separate database server. The credential key database 602 maintains a collection of credential key lists. A credential key list 604 includes a request environment 606 and credential keys 608. The request environment 606 identifies a particular customer environment which may be processed, a program, a computer system a virtual computer system, or a group of computer systems from which a service request may originate. The request environment 606 may be specified using one or more of a network address 610, machine ID 612, or geolocation 614. The network address 610 may specify a number of network addresses and/or network address ranges. The machine ID 612 may be an identifier assigned to a computing resource by a system administrator, a processor ID, a virtual machine ID assigned by a computing resource service provider or a hostname. The geolocation 614 may be a position on the earth, a relative position from a location sensor, or a logical position within a computer network or data center.

The credential keys 608 are comprised of one or more signature verification keys. A signature verification key 616 may be a symmetric cryptographic key, a cryptographic key pair, a passcode, a password, or other data that can be used to form a cryptographically verifiable digital signature. When a signed credential is received by a service provider, the service provider confirms a digital signature on the signed credential, and identifies the particular signature verification key used to create the digital signature. If the particular signature verification key is in the credential key list that is associated with the customer environment from which the service request originated, the service request may be fulfilled. If the particular signature verification key is not in the credential key list that is associated with the customer environment from which the service request originated, the service request is denied by the service provider.

In some implementations, credentials are signed by the service provider. An administrator of a customer environment submits credentials which are approved for use with the customer environment to the service provider. The administrative credentials provided with the submission authenticate the identity of the administrator and allow the service provider to apply and authorizing digital signature to the credentials. The signed credentials are returned to the administrator and installed into the customer environment. In another implementation, the service provider generates cryptographic keys for the customer environment and provides the cryptographic keys to an administrator of the customer environment. The administrator identifies credentials that may be used with the service provider and applies the signatures to the credentials before installing them within the customer environment.

Figure 7:
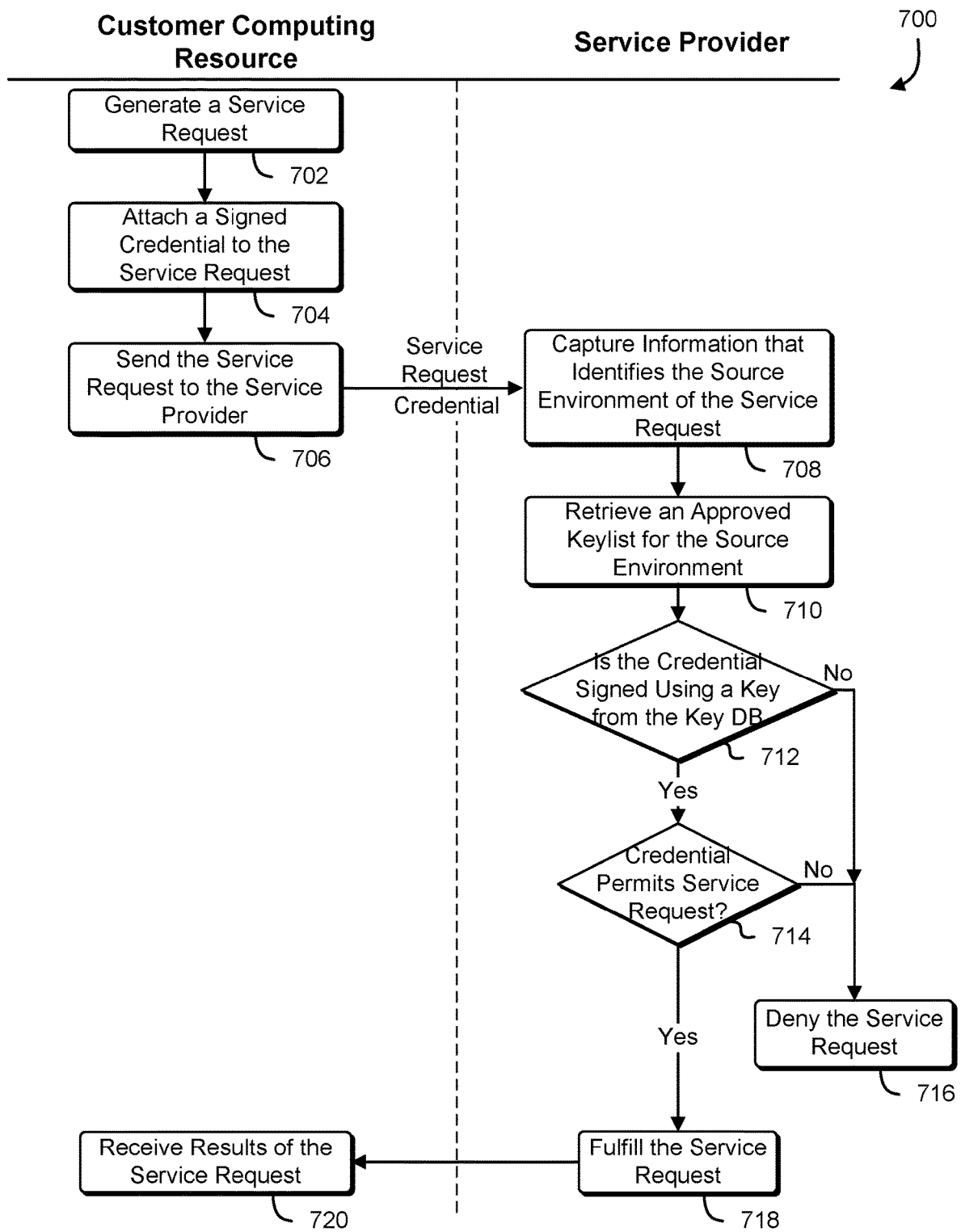
FIG. 7 shows an illustrative example of a process that, when performed by a computing resource provider and a service provider, determines whether a service request is authorized in part by validating a digital signature of a credential that is provided with a service request.

FIG. 7 shows an illustrative example of a process that, when performed by a computing resource provider and a service provider, determines whether a service request is authorized in part by validating a digital signature of a credential that is provided with a service request. A swim diagram 700 illustrates a process that begins at block 702 with a customer computing resource generating a service request for the service provider. The customer computing resource attaches 704 a credential to the generated service request. The credential is selected to have sufficient rights for fulfilling the service request. At block 706, the customer computing resource sends the service request and the credential to the service provider.

At block 708, the service provider receives the service request and the associated credential from the customer computing resource. The service provider captures information that identifies the source of the service request. In some examples, the service provider identifies the source of the service request by examining the network address from which the service request was sent. In another example, the service provider identifies the source of the service request from a machine ID provided with the service request. At block 710, the service provider retrieves a credential key list for the identified source environment. The credential key list specifies cryptographic keys with which acceptable credentials may be signed. At decision block 712, the service provider determines whether the credential supplied with the service request is signed using a cryptographic key from the credential key list. If the credential is not signed, the service provider denies the service request. If the credential provided with the service request is signed using a cryptographic key from the credential key list, execution proceeds to decision block 714, but if the credential provided with the service request is not signed using a cryptographic key from the credential key list, execution proceeds to block 716 and the service request is denied. At decision block 714, the service provider determines whether the credential provided with the service request authorizes the request. The credential authorizes the request when the permissions and policies associated with the credential grant rights are sufficient to fulfill the request. If the credential does not authorize the service request, execution proceeds to block 716 and the service request is denied.

If the service request is authorized by the credential, execution proceeds to block 718 and the service request is fulfilled by the service provider. As a result of fulfilling the service request, the service provider provides results to the customer computing resource. At block 720, the customer computing resource receives the results from the service provider.

Figure 8:
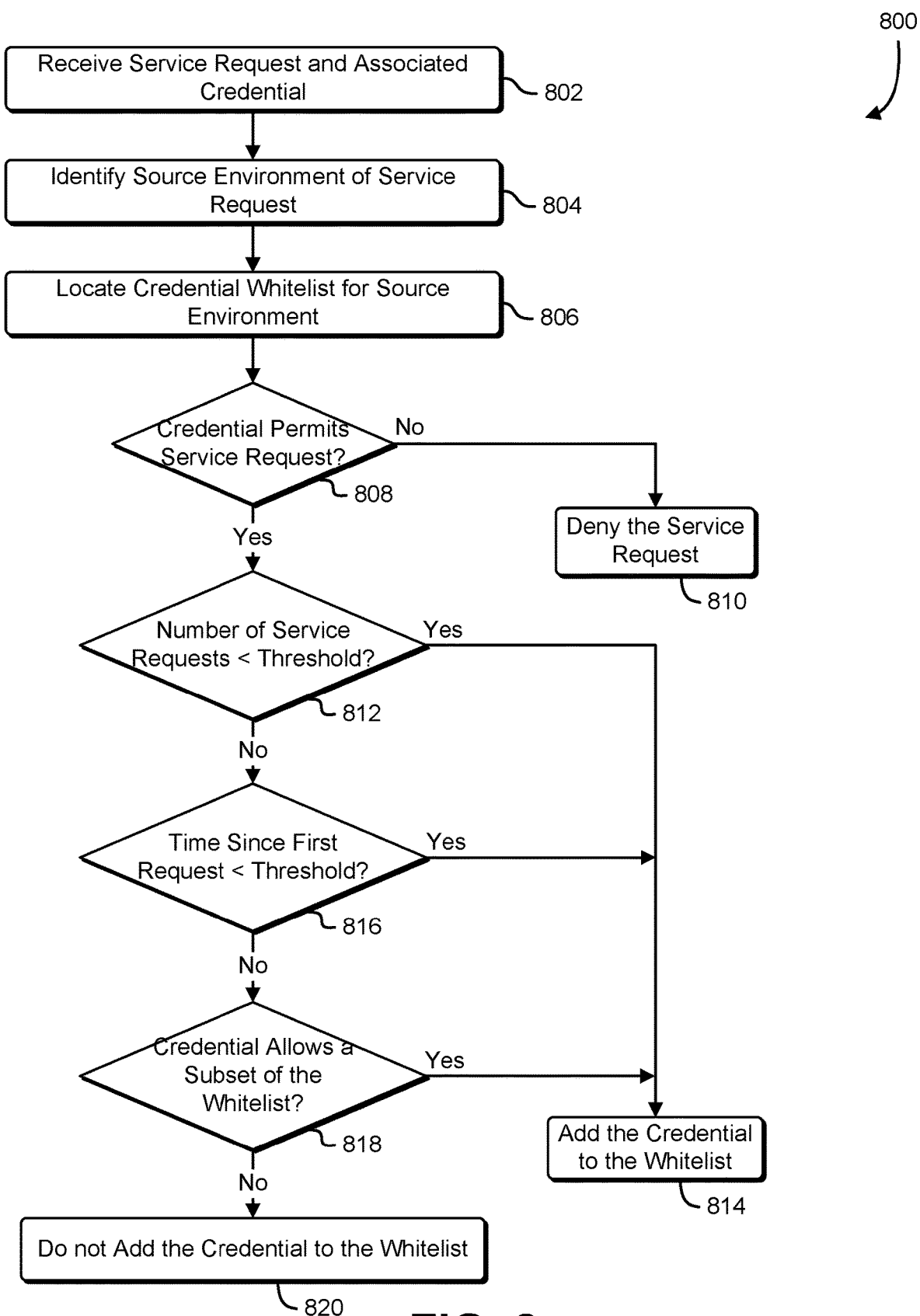
FIG. 8 shows an illustrative example of a process that, when performed by a service provider, populates a credential whitelist with credentials authorized for various entities that submit service requests.

FIG. 8 shows an illustrative example of a process that, when performed by a service provider, populates a credential whitelist with credentials authorized for various entities that submit service requests. A process diagram 800 shows a process that begins at block 802 with a service provider receiving a service request and a credential that is associated with the service request. At block 804, the service provider determines the source of the service request. In some implementations, the source of the service request is determined based at least in part on a source network address associated with the service request. In another implementation, the source of the service request is determined based at least in part on a session identifier that is associated with the network connection between the service provider and the source of the service request. In yet another implementation, the source of the service request is determined using a machine ID transmitted with the service request. The machine ID may be derived from a processor ID, or a virtual machine instance ID.

At block 806, the service provider attempts to locate a credential whitelist for the identified source of the service request. If a credential whitelist does not exist for the identified source of the service request, the service provider may create an empty credential whitelist. At decision block 808, the service provider determines whether the credential supplied with the service request grants policies and permissions sufficient to fulfill the service request. If the credential supplied with the service request is not able to fulfill the request, execution proceeds to block 810, and the service provider denies the service request. If the credential supplied with the service request is able to fulfill the request, execution proceeds to decision block 812.

Beginning at decision block 812, the service provider makes a number of determinations that determine whether the credential is added to the credential whitelist. At decision block 812, the service provider determines whether the total number of service requests from the identified source is less than a threshold number of service requests. The threshold number of service requests is adjusted so that the credential whitelist is populated with a majority of the legitimate credentials used from the customer's environment. After the threshold number of service requests are received, additional credentials are not added to the credential whitelist and will be rejected. In some implementations, the threshold number of service requests is one. If the total number of service requests from the identified source is less than the threshold number of service requests, execution advances to block 814 and the service provider adds the credential to the credential whitelist. If the total number of service requests from the identified source is greater than or equal to the threshold number of service requests, execution advances to decision block 816, and the service provider determines whether the amount of elapsed time from the first service request from the identified source is less than a threshold amount of time. The threshold amount of time is established so that the application submitting the service requests runs for sufficient time to submit a number of requests that have credentials that match a majority of different credentials used by the customer. The threshold amount of time may be adjusted to limit the amount of time an attacker has to launch a successful attack. In some examples, the threshold amount of time is one minute. If the amount of elapsed time from the first service request from the identified source is less than the threshold amount of time, execution advances to block 814 and the service provider adds the credential to the credential whitelist. If the amount of elapsed time from the first service request from the identified source is greater than or equal to the threshold amount of time execution advances to decision block 818.

At decision block 818, the credential supplied with the service request is analyzed in the context of existing credentials within the credential whitelist. If the credential supplied with the service request grants policies and rights that are less than those granted by the aggregate of the credentials currently within the credential whitelist, the service provider infers that the risk of adding the credential to the whitelist is low. As a result, execution advances to block 814 where the credential is added to the credential whitelist. If the credential supplied with the service request grants policies and rights that are not represented by the credentials already within the whitelist, execution proceeds to block 820. At block 820, the credential is not added to the whitelist.

Figure 9:
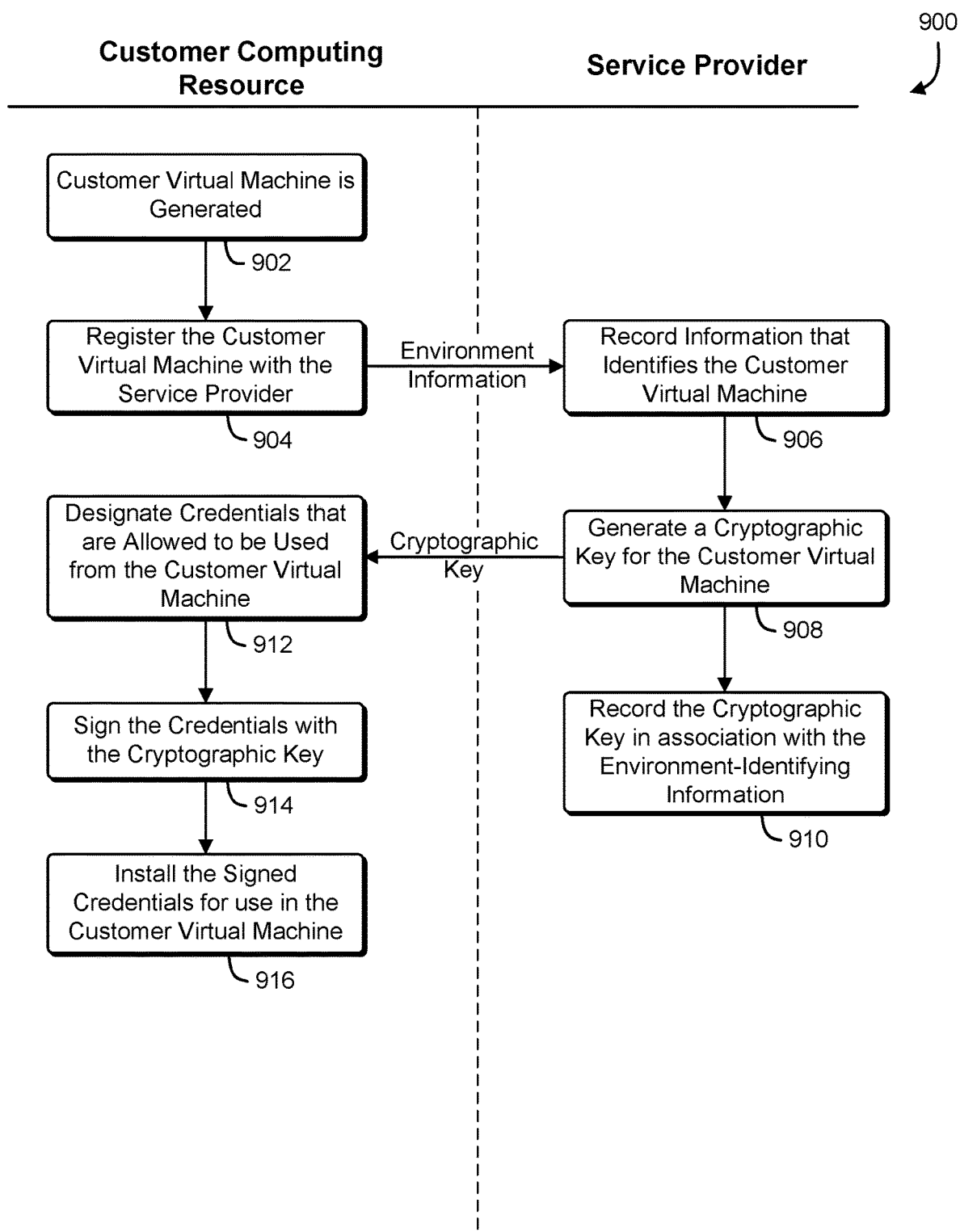
FIG. 9 shows an illustrative example of a process that, when performed by an administrator and a service provider, establishes a set of signed credentials that are usable to access services provided by the service provider, from within a customer environment.

FIG. 9 shows an illustrative example of a process that, when performed by an administrator and a service provider, establishes a set of signed credentials that are usable to access services provided by the service provider, from within a customer environment. A swim diagram 900 begins at block 902 with a customer computing resource generating a customer virtual machine that will access services provided by the service provider. At block 904 the customer computing resource registers the customer virtual machine with the service provider by sending a request that includes information that identifies the customer virtual machine. The information may include a machine identifier for the virtual machine, and a network address associated with the virtual machine.

At block 906, the service provider receives the request to register the customer virtual machine, and records the information that identifies the customer virtual machine. The service provider then generates 908 a cryptographic key for the customer virtual machine, and provides the cryptographic key to the customer computing resource for use in designating credentials that may be used with the customer virtual machine when requesting services from the service provider. At block 910, the service provider records the cryptographic key in a credential key list in association with the information that identifies the customer virtual machine.

The customer computing resource receives the cryptographic key from the source provider at block 912. At block 912, the customer computing resource designates particular credentials that are allowed to be used from the customer virtual machine. At block 914, the customer computing resource adds a digital signature to the designated credentials using the cryptographic key. The signed credentials are retained by the customer computing resource and installed 916 in the customer virtual machine for use by the customer virtual machine when accessing services provided by the service provider.

Figure 10:
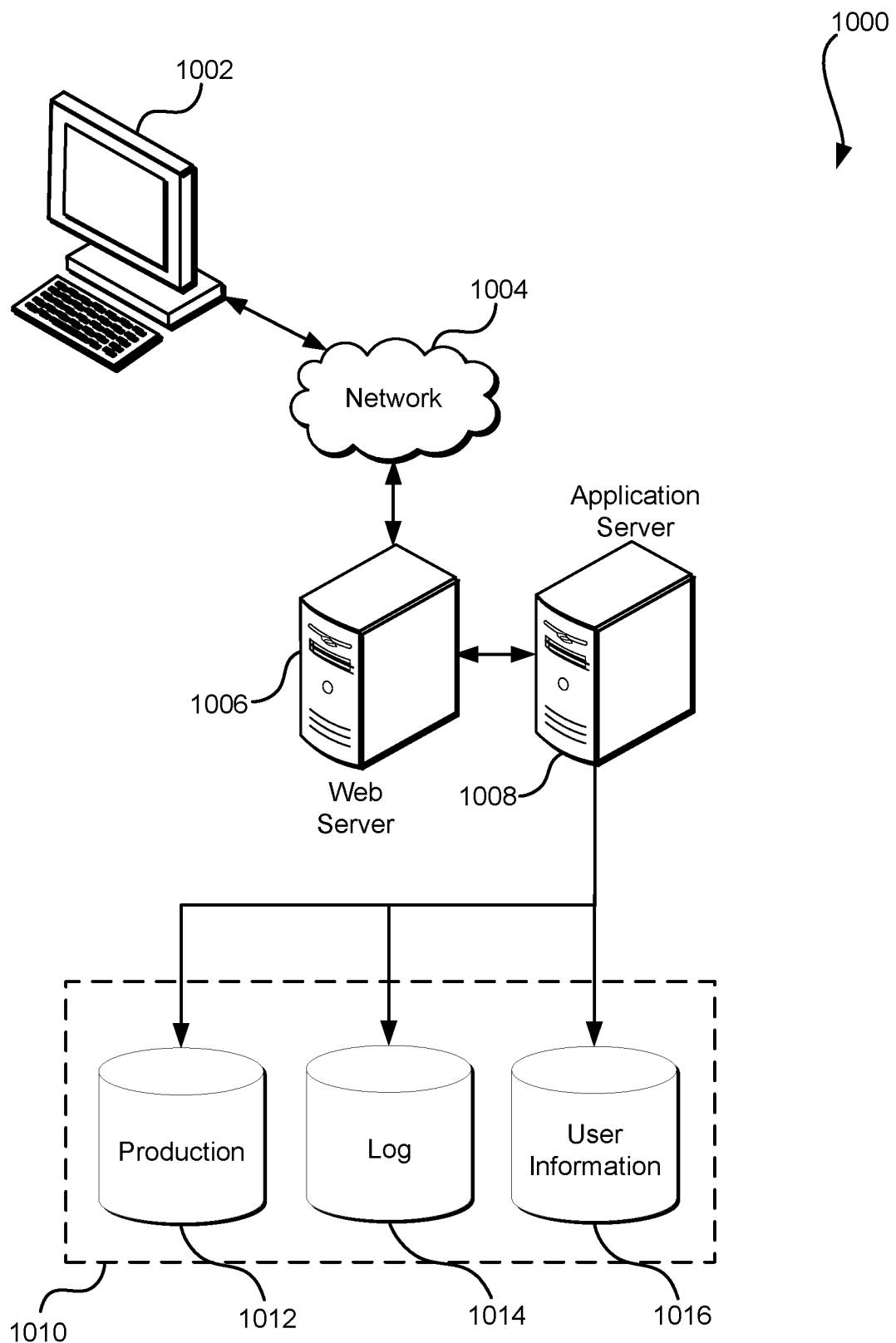
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages, or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network, and/or combination thereof. Components used for such a system can depend at least in part upon the type of network and/or environment selected. Many protocols and components for communicating via such a network are well known and will not be discussed herein in detail.

Communication over the network can be enabled by wired or wireless connections and combinations thereof. In this example, the network includes the Internet and/or other publicly addressable communications network, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices, and data storage media, in any standard, distributed, virtual, or clustered environment.

The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 1002 and the application server 1008, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. The application server 1008 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a webpage that the user is able to view via a browser on the client device 1002. Information for a particular item of interest can be viewed in a dedicated page or window of the browser. It should be noted, however, that embodiments of the present disclosure are not necessarily limited to the context of webpages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these, and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

As discussed, numerous variations utilize symmetric and/or asymmetric cryptographic primitives. Symmetric key algorithms may include various schemes for performing cryptographic operations on data including block ciphers, stream ciphers and digital signature schemes. Example symmetric key algorithms include the advanced encryption standard (AES), the data encryption standard (DES), triple DES (3DES), Serpent, Twofish, blowfish, CAST5, RC4, and the international data encryption algorithm (IDEA). Symmetric key algorithms may also include those used to generate output of one way functions and include algorithms that utilize hash-based message authentication codes (HMACs), message authentication codes (MACs) in general, PBKDF2, and Bcrypt. Asymmetric key algorithms may also include various schemes for performing cryptographic operations on data. Example algorithms include those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS #1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme, and the ECQV implicit certificate scheme. Other algorithms and combinations of algorithms are also considered as being within the scope of the present disclosure and the above is not intended to be an exhaustive list.

Note that the term "digital signature" includes any information usable to cryptographically verify authenticity of a message including information generated using an RSA-based digital scheme (such as RSA-PSS), the digital signature algorithm (DSA) and the elliptic curve digital signature algorithm, the ElGamal signature scheme, the Schnorr signature scheme, the Pointcheval-Stern signature algorithm, the Rabin signature algorithm, pairing-based digital signature schemes (such as the Boneh-Lynn-Schacham signature scheme), undeniable digital signature schemes, and others. Further, message authentication codes (such as hash-based message authentication codes (HMACs), keyed cryptographic hash functions, and other types of information may also be used as digital signatures.

Note that a system is said to be configured to trust a public cryptographic key if logic with which the system is configured to operate is dependent on whether an attempt to verify a digital signature with the public cryptographic key is successful. Similarly, a system is said to be configured to trust a symmetric cryptographic key if logic with which the system is configured to operate is dependent on whether an attempt to verify a digital signature with the symmetric cryptographic key is successful.

The location of the system can be determined using a variety of geolocation technologies such as global positioning systems ("GPS"), Wi-Fi based positioning systems ("WPS"), LORAN, GLONASS (Globalnaya Navigatsionnaya Sputnikovaya Sistema), Galileo global navigation satellite system, BeiDou Navigation Satellite System, Bluetooth-based positioning systems such as Zonith, or other geolocation hardware built into the system. In some implementations, terrestrial aviation-navigation signals such as Automatic Direction Finding ("ADF"), VHF Omnirange ("VOR"), are used to determine the geolocation of the system.

In various embodiments, data objects such as digital signatures may be cryptographically verifiable. In one example, cryptographically verifiable data objects are created to be cryptographically verifiable by the system to which the data object is to be provided or another system that operates in conjunction with the system to which the data object is to be provided. For example, the data object may be encrypted so as to be decryptable by the system that will cryptographically verify the data object, where the ability to decrypt the data object serves as cryptographic verification of the data object. As another example, the data object may be digitally signed (thereby producing a digital signature of the data object) such that the digital signature is verifiable by the system that will cryptographically verify the data object. In other examples, both encryption and digital signatures are used for cryptographic verifiability and/or security. The key used to encrypt and/or digitally sign the data object may vary in accordance with various embodiments and the same key is not necessarily used for both encryption and digital signing, where applicable. In some embodiments, a key used to encrypt the data object is a public key of a public/private key pair where the private key of the key pair is maintained securely by the system to which the data object is to be provided, thereby enabling the system to decrypt the data object using the private key of the key pair. Using the public key to encrypt the data object may include generating a symmetric key, using the symmetric key to encrypt the data object, and encrypting the symmetric key using the public key, where the encrypted symmetric key is provided to a system with the encrypted data object to enable the system to use the corresponding private key to decrypt the symmetric key and use the decrypted symmetric key to decrypt the data object. Further, in some embodiments, the data object is digitally signed using a private key of a public/private key pair corresponding to the computer system that encrypts and/or digitally signs the data object (e.g., a user device). For example, an application may be provisioned with the private key and the data object may include a certificate for the private key for use by a system for verification of the digital signature of the data object. Other variations, including variations where a symmetric key shared between the user computer and the system that cryptographically verifies the data object can be used to encrypt and/or digitally sign the data object.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    obtaining, from an entity within a customer environment, a service request and a credential associated with the service request, the service request representing a request to transfer data from within the customer environment to a destination outside the customer environment;
    identifying the customer environment based at least in part on a network address of the entity;
    selecting, from a set of credential profiles, based at least in part on the network address of the entity, a credential profile associated with the customer environment, the credential profile corresponding to a set of allowable credentials usable from the network address of the entity;
    determining that the credential associated with the service request is not in the set of allowable credentials; and
    denying the service request as a result of the service request originating from the network address and the credential not being usable from the network address of the entity.

2. The computer-implemented method of claim 1, wherein the computer-implemented method further comprises determining that the credential grants rights that allow the service request to be fulfilled.

3. The computer-implemented method of claim 1, wherein:

the credential profile identifies the set of allowable credentials; and
determining that the credential associated with the service request conflicts with the credential profile is accomplished in part by determining that the credential associated with the service request is excluded from the allowable set of credentials.

4. The computer-implemented method of claim 1, wherein the credential profile identifies a set of permissions to access a service provider.

5. A system, comprising at least one computing device implementing one or more services, wherein the one or more services:
    obtains a service request and a credential associated with the service request;
    identifies a network address from which the service request was sent;
    obtains information that describes allowable credentials based at least in part on the network address from which the service request was sent;
    determines that the credential associated with the service request is not allowed because the credential is associated with a request obtained from the network address, based at least in part on the information that describes the allowable credentials; and
    as a result of determining that the credential associated with the service request is not allowed and that the service request originates from the network address, denies the service request.

6. The system of claim 5, wherein the information that describes the allowable credentials is retained in a credential whitelist, the credential whitelist being associated with the network address.

7. The system of claim 6, wherein the one or more services further:
    determines whether the credential associated with the service request grants abilities that are a subset of abilities granted by a union of the allowable credentials; and
    as a result of determining that the credential associated with the service request grants abilities that are a subset of abilities granted by the union of the allowable credentials, adds the credential associated with the service request to the whitelist.

8. The system of claim 6, wherein the one or more services further:
    determines whether a threshold amount of time has elapsed since initialization of the one or more services; and
    as a result of having determined that the threshold amount of time has not elapsed, adds the credential associated with the service request to the whitelist, and grants the service request.

9. The system of claim 6, wherein the one or more services further:
    obtains a second service request and a second credential associated with the second service request;
    determines whether a threshold number of service requests has been obtained by the one or more services since initialization of the one or more services; and
    as a result of having determined that less than the threshold number of service requests has been obtained by the one or more services, adds the second credential associated with the second service request to the whitelist, and grants the second service request.

10. The system of claim 5, wherein the information that describes the allowable credentials is a set of cryptographic keys retained in a credential key list, the allowable credentials signed with a cryptographically verifiable digital signature based at least in part on the set of cryptographic keys.

11. The system of claim 10, wherein the system determines whether the credential associated with the service request is in accordance with the information in part by determining whether the credential associated with the service request includes a valid cryptographically verifiable digital signature, the valid cryptographically verifiable digital signature being verifiable using a particular cryptographic key from the set of cryptographic keys.

12. The system of claim 5, wherein the one or more services further:
 obtains, from an administrator associated with a customer environment, a candidate credential;
 signs the candidate credential using a cryptographic key to produce a signed credential;
 stores the cryptographic key in association with information that identifies the customer environment; and
 provides the signed credential to the administrator.

13. A non-transitory computer-readable storage medium including stored thereon executable instructions that, as a result of being executed by one or more processors of a computer system, cause the computer system to at least:
 obtain a credential from a customer environment;
 identify the customer environment based at least in part on a network address associated with the source of a service request;
 determine a set of allowable credentials for the service request based at least in part on the network address associated with the source of the service request;
 determine that the credential is not in the set of allowable credentials; and
 as a result of having determined that the credential was provided from the network address and is not in the set of allowable credentials, deny the service request that would otherwise be allowable with the credential.

14. The non-transitory computer-readable storage medium of claim 13, wherein the information that identifies the customer environment is a network address, a range of network addresses, or a subnet.

15. The non-transitory computer-readable storage medium of claim 13, wherein:
 the information that identifies the customer environment includes a geolocation; and
 the set of allowable credentials is determined in part by comparing the geolocation to a geographical region associated with the customer environment.

16. The non-transitory computer-readable storage medium of claim 13, wherein the instructions further include instructions that cause the computer system to:
 determine a set of allowable actions based at least in part on the information that identifies the customer environment; and
 determine that the credential allows actions outside of the set of allowable actions.

17. The non-transitory computer-readable storage medium of claim 13, wherein the instructions further include instructions that cause the computer system to:
 determine a set of accessible resources based at least in part on the information that identifies the customer environment; and
 determine that the credential allows access to resources outside the set of accessible resources.

18. The non-transitory computer-readable storage medium of claim 13, wherein the instructions further include instructions that cause the computer system to:
 identify a set of credentials from a credential whitelist, the set of credentials associated with the customer environment; and
 determine whether the credential is in the set of credentials from the credential whitelist.

19. The non-transitory computer-readable storage medium of claim 13, wherein the service request is denied by:
 encrypting data responsive to the service request with a cryptographic key associated with the customer to produce encrypted data; and
 fulfilling the service request with the encrypted data.

20. The non-transitory computer-readable storage medium of claim 13, wherein the information that identifies the customer environment identifies a particular instance of a virtual machine, container, process space, virtual network, virtual private cloud, network, or subnet.

\* \* \* \* \*